US008854568B2

(12) United States Patent
Xu et al.

(10) Patent No.: US 8,854,568 B2
(45) Date of Patent: Oct. 7, 2014

(54) ARRAY SUBSTRATE, LIQUID CRYSTAL PANEL AND DISPLAY DEVICE

(75) Inventors: Yongxian Xu, Beijing (CN); Changlin Leng, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 379 days.

(21) Appl. No.: 13/428,366

(22) Filed: Mar. 23, 2012

(65) Prior Publication Data

US 2012/0242920 A1    Sep. 27, 2012

(30) Foreign Application Priority Data

Mar. 25, 2011    (CN) ...................... 2011 2 0083750 U

(51) Int. Cl.
| | | |
|---|---|---|
| *G02F 1/1368* | (2006.01) | |
| *H01L 29/10* | (2006.01) | |
| *H01L 31/00* | (2006.01) | |
| *G02F 1/1362* | (2006.01) | |
| *G09G 3/36* | (2006.01) | |

(52) U.S. Cl.
CPC .. *G02F 1/136213* (2013.01); *G09G 2300/0404* (2013.01); *G09G 3/36* (2013.01)
USPC ................. 349/48; 349/38; 349/43; 349/110; 349/116; 257/59

(58) Field of Classification Search
CPC ............ G02F 1/136213; G02F 1/1368; G02F 1/13318; G02F 1/1354; G02F 1/135; G02F 1/13312; G02F 2001/13312; G09G 3/36; G09G 3/3648; G09G 2300/0404; G09G 2300/0478
USPC ................... 349/38, 39, 42, 43, 48, 110, 116; 257/59, E29.043; 345/92
See application file for complete search history.

(56) References Cited

U.S. PATENT DOCUMENTS

| | | | |
|---|---|---|---|
| 7,787,081 B2 * | 8/2010 | Chen et al. ..................... | 349/116 |
| 2007/0176905 A1 * | 8/2007 | Shih et al. ...................... | 345/173 |
| 2011/0043718 A1 * | 2/2011 | Chin ............................... | 349/39 |

* cited by examiner

*Primary Examiner* — Dung Nguyen
*Assistant Examiner* — Tai Duong
(74) *Attorney, Agent, or Firm* — Ladas & Parry LLP

(57) ABSTRACT

Embodiments of the disclosed technology provide an array substrate comprising a plurality of pixel units each of which comprises a gate scanning line, a source scanning line, a thin film transistor (TFT), a storage capacitor, and at least one photosensitive transistor, wherein a gate electrode of the photosensitive transistor and a gate electrode of the TFT are connected with the same gate scanning line, a drain electrode of the photosensitive transistor and a drain electrode of the TFT are connected with the storage capacitor, a source electrode of the TFT is connected with the source scanning line, and a source electrode of the photosensitive transistor is connected with its own gate electrode. In addition, the embodiments of the disclosed technology also provide a liquid crystal panel comprising the array substrate and a display device comprising the liquid crystal panel.

15 Claims, 3 Drawing Sheets

ARRAY SUBSTRATE, LIQUID CRYSTAL PANEL AND DISPLAY DEVICE

BACKGROUND

Embodiments of the disclosed technology relate to an array substrate, a liquid crystal panel and a display device.

In a conventional liquid crystal display (LCD), an array substrate pixel unit, an equivalent circuit diagram of which is shown in FIG. 1, comprises a source scanning line 1, a gate scanning line 2, a thin film transistor (TFT) 3, and a storage capacitor 4 (represented by $C_{st}$; and $C_{lc}$ refers to an equivalent liquid crystal (LC) capacitor for displaying). The source scanning line 1 is perpendicular to the gate scanning line 2, the gate electrode of the TFT 3 is connected with the gate scanning line 2, and the drain electrode of the TFT 3 is connected with the storage capacitor 4. The TFT 3 can be turned on by a gate scanning signal transmitted over the gate scanning line 4 so as to charge the storage capacitor 4 and the equivalent liquid crystal capacitor. However, when the refresh frequency of the liquid crystal panel is increased up to 120 Hz or more, the time period for charging the pixel is very short, which may cause undercharge of the storage capacitor.

SUMMARY

An embodiment of the disclosed technology provides an array substrate comprising a plurality of pixel units each of which comprises a gate scanning line, a source scanning line, a thin film transistor (TFT), a storage capacitor, and at least one photosensitive transistor, wherein a gate electrode of the photosensitive transistor and a gate electrode of the TFT are connected with the same gate scanning line, a drain electrode of the photosensitive transistor and a drain electrode of the TFT are connected with the storage capacitor, a source electrode of the TFT is connected with the source scanning line, and a source electrode of the photosensitive transistor is connected with its own gate electrode.

Another embodiment of the disclosed technology provides a liquid crystal panel, comprising a color filter substrate, an array substrate and a liquid crystal layer interposed therebetween, wherein the color filter substrate comprises color filters and a black matrix thereon, and the array substrate can be any one array substrate according to the embodiments of the disclosed technology.

Still another embodiment of the disclosed technology provides a display device comprising any one liquid crystal panel according to the embodiments of the disclosed technology.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

First Embodiment

Figure 1:
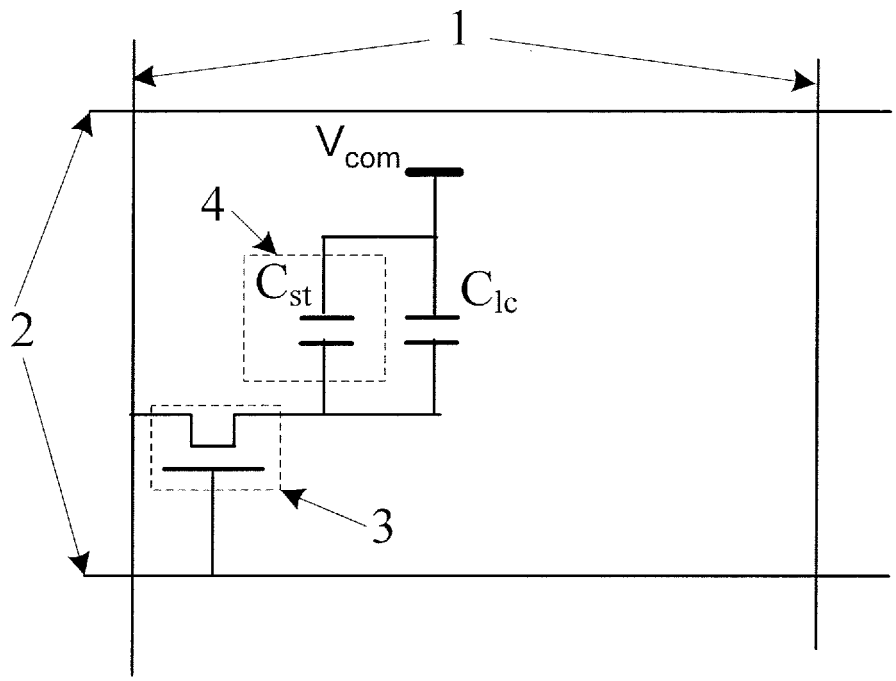
FIG. 1 is a schematic view of an array substrate pixel unit in the prior art.
Figure 2:
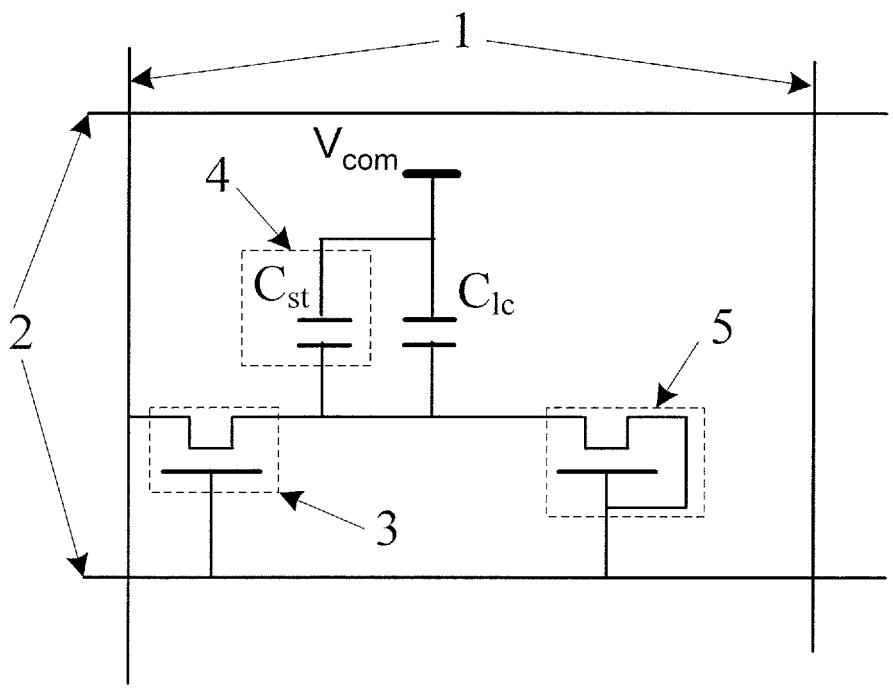
FIG. 2 is a schematic view of an array substrate structure according to an embodiment of the disclosed technology.

As shown in FIG. 2, an array substrate pixel unit according to an embodiment of the disclosed technology comprises a source scanning line 1, a gate scanning line 2, a thin film transistor (TFT) 3 as a switching element for the pixel unit, a storage capacitor ($C_{st}$) 4, and one photosensitive transistor 5. A gate electrode of the photosensitive transistor 5 and a gate electrode of the TFT 3 are both connected with the same gate scanning line 2, a drain electrode of the photosensitive transistor 5 and a drain electrode of the TFT 3 are both connected with one end of the storage capacitor 4, a source electrode of the TFT 3 is connected with the source scanning line 1, and a source electrode of the photosensitive transistor 5 is connected with its own gate electrode. Specifically, both the drain electrode of the photosensitive transistor 5 and the drain electrode of the TFT 3 are connected with a pixel electrode of the array substrate, which forms an equivalent LC capacitor with a common electrode for displaying, and connected with one electrode of the storage capacitor for charging the LC capacitor and the storage capacitor 4. In this embodiment, the storage capacitor 4 may be formed with a storage electrode as one end and a part of the pixel electrode of the pixel unit as another end. In one example, as in the case shown in FIG. 2, a common electrode line can be used as the storage electrode. Alternatively, a gate scanning line can be used as the storage electrode.

During operation, while the TFT 3 is turned on by a gate scanning signal transmitted over the gate scanning line 2 to charge the equivalent LC capacitor and the storage capacitor 4, the photosensitive transistor 5 is also turned on by the same gate scanning signal. At this time, the photosensitive transistor 5 conducts photoelectric conversion due to the light irradiation from a back-light and/or an external light source (e.g., ambient light) and charges the storage capacitor 4 with the electrical current generated by the photoelectric conversion, so that the storage capacitor 4 can be charged to a desired level in a short period of time.

Second Embodiment

Figure 3:
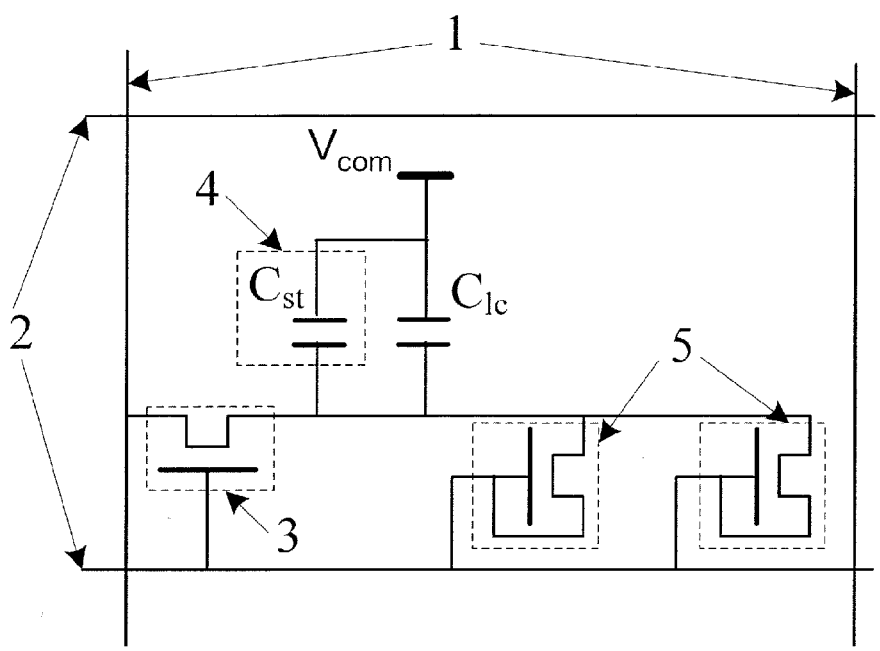
FIG. 3 is a schematic view of an array substrate structure according to another embodiment of the disclosed technology.

On the basis of the pixel unit as described in the first embodiment, the pixel unit according to the present embodiment may comprise more than one photosensitive transistor, e.g., a plurality of photosensitive transistors. The gate electrodes of the photosensitive transistors and the gate electrode of the TFT 3 can be all connected with the same gate scanning line 2, the drain electrodes of the photosensitive transistors and the drain electrode of the TFT 3 are all connected with the storage capacitor 4, and the source electrodes of the photosensitive transistors are connected with their own gate electrodes, respectively. If there is a size limitation on the pixel unit, preferably, there may be two photosensitive transistors 5 according to the present embodiment. As shown in FIG. 3, the array substrate pixel unit, compared with the array substrate pixel unit in the first embodiment, has two photosensitive transistors 5. The drain electrodes of the two photosensitive transistors 5 and the drain electrode of the TFT 3 are all connected with one end of the storage capacitor 4, and the source electrodes of the two photosensitive transistors 5 are connected with their own gate electrodes, respectively. Specifically, both the drain electrodes of the photosensitive transistors 5 and the drain electrode of the TFT 3 are connected with the pixel electrode of the array substrate, which forms an equivalent LC capacitor with a common electrode for displaying, and connected with one end of the storage capacitor for charging the LC capacitor. In this embodiment, the storage capacitor 4 may be formed with a storage electrode as one end and a part of the pixel electrode of the pixel unit as another end. In one example, as in the case shown in FIG. 3, a common electrode line can be used as the storage electrode. Alternatively, a gate scanning line can be used as the storage electrode.

The operating principle of the array substrate pixel unit according to the embodiment is similar to that in the first embodiment. When the two photosensitive transistors 5 are turned on by a gate scanning signal, they are turned on simultaneously. The two photosensitive transistors 5 conduct photoelectric conversion due to the light irradiation from the back-light and/or the external light source, and charge the storage capacitor 4 with the electrical current generated by the photoelectric conversion.

The embodiments of the disclosed technology provide an array substrate with a pixel unit according to any one of the first and second embodiments. The array substrate may conduct photoelectric conversion due to light irradiation from a back-light and/or an external light source by using a photosensitive transistor in the pixel unit and charge the storage capacitor 4 with the electrical current generated by the photoelectric conversion. The schematic view of the array substrate may refer to the array substrate 9 shown in FIG. 4, 5, 6 or 7, in which only the photosensitive transistor 5 is illustrated.

Third Embodiment

Figure 4:
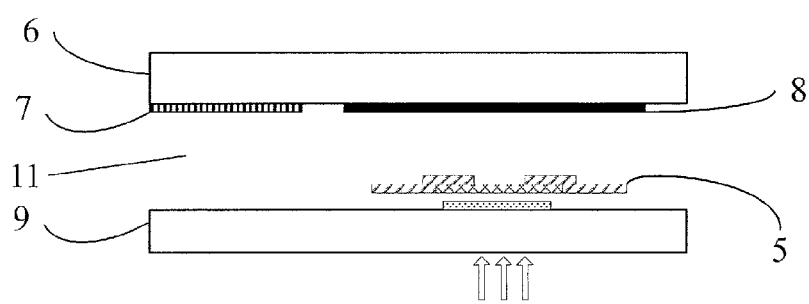
FIG. 4 is a schematic cross-sectional view of a liquid crystal panel which comprises the array substrate pixel unit as shown in FIG. 2 and has a back-light as the light source according to an embodiment of the disclosed technology.

FIG. 4 is a schematic cross-sectional view of a liquid crystal panel which comprises the array substrate pixel unit as shown in FIG. 2 and has a back-light as the light source of the photosensitive transistor 5 according to an embodiment of the disclosed technology. The liquid crystal panel comprises a color filter substrate 6, an array substrate 9 with the pixel unit as described above, and a liquid crystal layer 11 interposed therebetween. The back-light (not shown) is provided under the array substrate 9 in the drawing, and the light from the back-light is shown with arrows. The color filter substrate 6 comprises color filters 7 and a black matrix 8 thereon. In this embodiment, the photosensitive transistor 5 is provided on the array substrate within a region corresponding to or opposite to the black matrix 8. While the TFT 3 is turned on by a gate scanning line signal to charge the LC capacitor and the storage capacitor 4, the photosensitive transistor 5 is also turned on by the same signal. At this time, the photosensitive transistor 5 conducts photoelectric conversion due to the light irradiation from the back-light and charges the storage capacitor 4 by using the electrical current generated by the photoelectric conversion.

Fourth Embodiment

Figure 5:
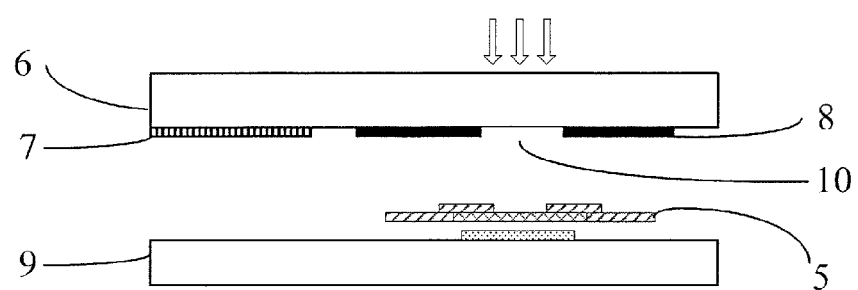
FIG. 5 is a schematic cross-sectional view of a liquid crystal panel which comprises the array substrate pixel unit as shown in FIG. 2 and has an external light source as the light source according to an embodiment of the disclosed technology.

FIG. 5 is a schematic cross-sectional view of a liquid crystal panel which comprises the array substrate pixel unit as shown in FIG. 2 and has an external light source as the light source of the photosensitive transistor 5 according to an embodiment of the disclosed technology. The liquid crystal panel is similar to that of the third embodiment, but different from the third embodiment in that a light transmission window 10 is provided in the black matrix 8 in a region corresponding to the photosensitive transistor 5, and the window 10 is used to allow the external light irradiated on the photosensitive transistor 5. The light from the outside of the panel is shown with arrows in FIG. 5. While the TFT 3 is turned on by the gate scanning signal to charge the LC capacitor and the storage capacitor 4, the photosensitive transistor 5 is also turned on by the same signal. At this time, the photosensitive transistor 5 conducts photoelectric conversion due to the external light, and charges the storage capacitor 4 with the electrical current generated by the photoelectric conversion.

Fifth Embodiment

Figure 6:
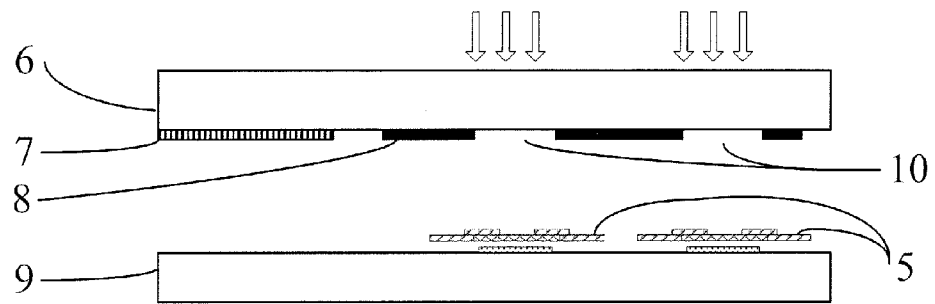
FIG. 6 is a schematic cross-sectional view of a liquid crystal panel which comprises the array substrate pixel unit as shown in FIG. 3 and has a back-light as a light source according to an embodiment of the disclosed technology.

FIG. 6 is a schematic cross-sectional view of a liquid crystal panel which comprises the array substrate pixel unit as shown in FIG. 3 and has an external light source as a light source of the photosensitive transistors 5 according to an embodiment of the disclosed technology. The liquid crystal panel is similar to that of the third embodiment, but different from the third embodiment in that each pixel unit on the array substrate 9 comprises two photosensitive transistors 5, and two light transmission windows 10 are provided in the black matrix 8 in the regions according to the two photosensitive transistors 5 and used to allow the external light irradiated on the surface of the photosensitive transistors 5. The light from the outside of the panel is shown with arrows in FIG. 6. While the TFT 3 is turned on by the gate scanning signal to charge the LC capacitor and the storage capacitor 4, the two photosensitive transistors 5 are also turned on by the same signal. At this time, the two photosensitive transistors 5 conduct photoelectric conversion due to the external light, and charge the storage capacitor 4 with the electrical current generated by the photoelectric conversion. In addition, if each pixel unit comprises a plurality of (e.g., two or more) photosensitive transistors 5, all of them can use the external light source, i.e., one light transmission window 10 is provided in the black matrix 8 corresponding to each of the plurality of photosensitive transistors 5.

Sixth Embodiment

Figure 7:
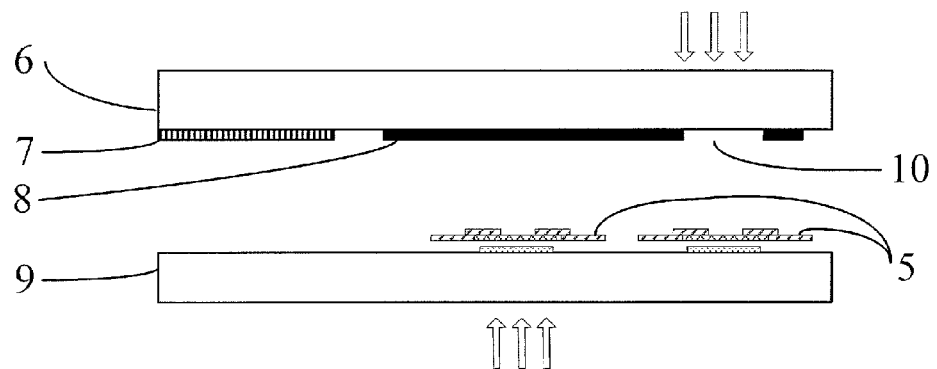
FIG. 7 a schematic cross-sectional view of a liquid crystal panel which comprises the array substrate pixel unit as shown in FIG. 3 and has an external light source and a back-light as a light source according to an embodiment of the disclosed technology.

FIG. 7 is a schematic cross-sectional view of a liquid crystal panel which comprises the array substrate pixel unit as shown in FIG. 3 and has an external light source and a backlight as light sources of the photosensitive transistors 5 according to an embodiment of the disclosed technology. The liquid crystal panel is similar to that of the fifth embodiment, but different from the fifth embodiment in that a light transmission window 10 is provided in the black matrix 8 corresponding to one of the photosensitive transistors and used to allow the external light irradiated on the surface of the photosensitive transistor 5, and no window is provided in the black matrix 8 corresponding to the other photosensitive transistor 5. The back-light (not shown) is provided under the array substrate 9 in the drawing, and the light from the back-light and the external light source is shown with arrows. While the TFT 3 is turned on by the gate scanning signal to charge the LC capacitor and the storage capacitor 4, the two photosensitive transistors 5 are also turned on by the same signal. At this time, one of the photosensitive transistor 5 conducts photoelectric conversion due to the external light, and the other one conducts photoelectric conversion due to the light irradiation from the back-light, and the photosensitive transistors charge the storage capacitor 4 with the electrical currents generated by the photoelectric conversion.

If there are a plurality of (e.g., N≥2) photosensitive transistors 5 in the array substrate pixel unit, one light transmission window is provided corresponding to each of M (M<N) photosensitive transistors 5 in the black matrix 8 for making the external light irradiated on the surfaces of these photosensitive transistors 5. For the situation as shown in FIG. 7, M=1, and N=2.

In addition, if there are a plurality of photosensitive transistors 5 in each of the pixel unit on the array substrate 9, all of them can use the light from the back-light, i.e., no light transmission window is needed to be opened in the black matrix 8.

Seventh Embodiment

The embodiment provides a display device which has a liquid crystal panel as described in any one of the third to sixth embodiments.

The disclosed technology is described by referring to the embodiments as above, but the disclosed technology is not limited to the above embodiments. As for the photosensitive transistor in the above embodiments, it is preferable that its "ON" voltage for turning on the transistor is equal to or close to that of the TFT as the switching element of a pixel unit, so that the TFT and the photosensitive transistor can be turned on simultaneously by the gate scanning line 2. As for the photosensitive transistor, it can conduct photoelectric conversion due to light irradiation on itself, and can output the electrical current obtained by the photoelectric conversion through the drain electrode when it is turned on, so that the storage capacitor can be charged. In addition, the photosensitive transistor does not output voltage or current to the external side when the photosensitive transistor is turned off.

As for the embodiments of the disclosed technology, one or more photosensitive transistors are added into the array substrate pixel unit, and a light transmission window is provided in the black matrix corresponding to the photosensitive transistor in the liquid crystal panel structure so as to allow the photosensitive transistor receive the external light, or the photosensitive transistor can receive the light from the backlight. While the TFT as a switching element of the pixel unit is turned on by a gate electrode signal to charge the LC capacitor and the storage capacitor, the photosensitive transistor is also turned on by the same signal. At this time, the light received by the photosensitive transistor conducts photoelectric conversion due to the received light and charge the storage capacitor, so that the storage capacitor can be charged to a desired level in a short period of time. Thus, under charge of the storage capacitor due to short charging time period may be avoided when the refresh frequency is increased up to 120 Hz or more. The photosensitive transistor may have a similar structure with the TFT which is used as the switching element, and its active layer may employ, for example, amorphous silicon (a-Si). Therefore, the photosensitive transistor can be fabricated together with the TFT which is used as the switching element without additional processes. In addition, the voltage applied by the photoresist transistor can be controlled to be equal to or less than a voltage needed by the corresponding pixel unit for displaying.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. An array substrate comprising a plurality of pixel units each of which comprises a gate scanning line, a source scanning line, a thin film transistor (TFT), a storage capacitor, and at least one photosensitive transistor, wherein a gate electrode of the photosensitive transistor and a gate electrode of the TFT are connected with the same gate scanning line, a drain electrode of the photosensitive transistor and a drain electrode of the TFT are connected with the storage capacitor, a source electrode of the TFT is connected with the source scanning line, and a source electrode of the photosensitive transistor is connected with its own gate electrode.

2. The array substrate of claim 1, wherein two photosensitive transistors are provided in each pixel unit, the gate electrode of the TFT and the gate electrodes of the two photosensitive transistors are connected with the same gate scanning line, the drain electrode of the TFT and the drain electrodes of the two photosensitive transistors are connected with the storage capacitor, and the source electrodes of the two photosensitive transistors are connected with their own gate electrodes.

3. The array substrate of claim 1, wherein each of the pixel unit further comprises a pixel electrode, and the drain electrode of the TFT and the drain electrode of the photosensitive transistor are connected with the pixel electrode.

4. The array substrate of claim 2, wherein each of the pixel unit further comprises a pixel electrode, and the drain electrode of the TFT and the drain electrodes of the two photosensitive transistors are connected with the pixel electrode.

5. The array substrate of claim 1, wherein the ON voltage of the photosensitive transistor is equal to or close to that of the TFT.

6. The array substrate of claim 1, wherein a voltage applied by the photosensitive transistor is equal to or less than a voltage needed by the corresponding pixel unit for displaying.

7. A liquid crystal panel, comprising a color filter substrate, an array substrate and a liquid crystal layer interposed therebetween, wherein the color filter substrate comprises color filters and a black matrix thereon, wherein the array substrate comprises a plurality of pixel units each of which comprises a gate scanning line, a source scanning line, a thin film transistor (TFT), a storage capacitor, and at least one photosensitive transistor, and wherein a gate electrode of the photosensitive transistor and a gate electrode of the TFT are connected with the same gate scanning line, a drain electrode of the photosensitive transistor and a drain electrode of the TFT are connected with the storage capacitor, a source electrode of the TFT is connected with the source scanning line, and a source electrode of the photosensitive transistor is connected with its own gate electrode.

8. The liquid crystal display of claim 7, wherein a light transmission window is provided in the black matrix corresponding to the photosensitive transistor so that the external light can pass through the light transmission window and is irradiated onto the photosensitive transistor.

9. The liquid crystal panel of claim 7, wherein N (N is an integer of 2 or larger) photosensitive transistors are provided in each pixel unit, and M (M is an integer and less than N) light transmission windows are provided in the black matrix corresponding to M photosensitive transistors of the N photosensitive transistors to allow the external light irradiated onto the M photosensitive transistors.

10. The liquid crystal panel of claim 7, wherein two photosensitive transistors are provided in each pixel unit, the gate electrode of the TFT and the gate electrodes of the two photosensitive transistor are connected with the same gate scanning line, the drain electrode of the TFT and the drain electrodes of the two photosensitive transistors are connected with the storage capacitor, and the source electrodes of the two photosensitive transistors are connected with their own gate electrodes.

11. The liquid crystal panel of claim 7, wherein each of the pixel unit further comprises a pixel electrode, and the drain electrode of the TFT and the drain electrode of the photosensitive transistor are connected with the pixel electrode.

12. The liquid crystal panel of claim 10, wherein each of the pixel unit further comprises a pixel electrode, and the drain electrode of the TFT and the drain electrodes of the two photosensitive transistors are connected with the pixel electrode.

13. The liquid crystal panel of claim 7, wherein the ON voltage of the photosensitive transistor is equal to or close to that of the TFT.

14. The liquid crystal panel of claim 7, wherein a voltage applied by the photosensitive transistor is equal to or less than a voltage needed by the corresponding pixel unit for displaying.

15. A display device comprising a liquid crystal panel which comprises a color filter substrate, an array substrate and a liquid crystal layer interposed therebetween, wherein the color filter substrate comprises color filters and a black matrix thereon, wherein the array substrate comprises a plurality of pixel units each of which comprises a gate scanning line, a source scanning line, a thin film transistor (TFT), a storage capacitor, and at least one photosensitive transistor, and wherein a gate electrode of the photosensitive transistor and a gate electrode of the TFT are connected with the same gate scanning line, a drain electrode of the photosensitive transistor and a drain electrode of the TFT are connected with the storage capacitor, a source electrode of the TFT is connected with the source scanning line, and a source electrode of the photosensitive transistor is connected with its own gate electrode.

* * * * *